United States Patent
Mann et al.

(10) Patent No.: US 12,137,155 B2
(45) Date of Patent: *Nov. 5, 2024

(54) ANALYZING NETWORK DATA FOR DEBUGGING, PERFORMANCE, AND IDENTIFYING PROTOCOL VIOLATIONS USING PARALLEL MULTI-THREADED PROCESSING

(71) Applicant: VIAVI Solutions Inc., Chandler, AZ (US)

(72) Inventors: Jason Mann, Austin, TX (US); Yamini Shastry, Burlingame, CA (US); George Bullis, Glendora, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,053

(22) Filed: Apr. 26, 2023

(65) Prior Publication Data

US 2023/0262146 A1 Aug. 17, 2023

Related U.S. Application Data

(63) Continuation of application No. 16/949,397, filed on Oct. 28, 2020, now Pat. No. 11,665,262.

(51) Int. Cl.
*H04L 69/00* (2022.01)
*G06F 11/34* (2006.01)
*H04L 43/08* (2022.01)

(52) U.S. Cl.
CPC .............. *H04L 69/03* (2013.01); *H04L 69/00* (2013.01); *H04L 69/02* (2013.01); *G06F 11/34* (2013.01); *H04L 43/08* (2013.01)

(58) Field of Classification Search
CPC . H04L 43/08; H04L 43/0817; H04L 43/0823; H04L 43/0852; H04L 43/0876; H04L 43/12; H04L 43/18; H04L 43/00; H04L 43/04; H04L 43/02; H04L 69/02; H04L 69/03; H04L 69/00; H04W 12/06; H04W 12/08; H04W 12/106;
(Continued)

(56) References Cited

U.S. PATENT DOCUMENTS 6,094,729 A 7/2000 Mann
6,675,164 B2 * 1/2004 Kamath .............. G06F 16/2465
706/45

(Continued)

*Primary Examiner* — Rachel J Hackenberg
(74) *Attorney, Agent, or Firm* — Harrity & Harrity, LLP

(57) ABSTRACT

A device may receive network protocol data identifying a network protocol trace associated with network devices of a network, and may divide the network protocol trace into multiple segments. The device may identify a set of segments, in the multiple segments, that includes a first segment and second segments related to the first segment, and may process the multiple segments, in parallel, to determine first results data corresponding to the multiple segments. The device may process the second segments, in parallel, to determine second results data, and may combine the first results data and the second results data to generate final results data, wherein the final results data indicate utilization by the network devices of a network protocol associated with the network. The device may perform one or more actions based on the final results data.

20 Claims, 13 Drawing Sheets

(58) Field of Classification Search
CPC ..... H04W 24/02; H04W 24/04; H04W 24/10; G06F 11/34; G06F 11/3404; G06F 11/3409; G06F 11/3452; G06F 11/3466; G06F 11/3471; G06F 11/3476; G06F 11/348; G06F 11/3485; G06F 11/349; G06F 11/3495; G06F 11/36; G06F 11/3065; G06F 11/30; G06F 11/3006
See application file for complete search history.

(56) References Cited

U.S. PATENT DOCUMENTS

| | | | |
|---|---|---|---|
| 6,748,431 | B1 | 6/2004 | Fleig et al. |
| 7,284,052 | B1 | 10/2007 | Anderson |
| 8,527,960 | B2 | 9/2013 | Schmelter et al. |
| 9,015,536 | B1 | 4/2015 | Ricken et al. |
| 9,634,920 | B1 | 4/2017 | Goldberg et al. |
| 10,416,974 | B2 * | 9/2019 | Kavanagh ........... G06F 11/3476 |
| 2005/0076113 | A1 | 4/2005 | Klotz et al. |
| 2009/0281984 | A1 | 11/2009 | Black |
| 2011/0219376 | A1 | 9/2011 | Williams et al. |
| 2012/0331347 | A1 | 12/2012 | Carey et al. |
| 2016/0088083 | A1 | 3/2016 | Bharadwaj et al. |
| 2018/0077183 | A1 | 3/2018 | Swann et al. |
| 2019/0050317 | A1 | 2/2019 | Melville et al. |
| 2019/0052531 | A1 | 2/2019 | Sividia et al. |
| 2019/0173897 | A1 | 6/2019 | Okano |
| 2019/0349426 | A1 | 11/2019 | Smith et al. |
| 2020/0076852 | A1 * | 3/2020 | Klaedtke ................. G06F 9/542 |
| 2020/0394073 | A1 | 12/2020 | Dutta et al. |
| 2021/0034289 | A1 | 2/2021 | Dalmatov et al. |
| 2021/0312450 | A1 | 10/2021 | Allbright et al. |
| 2022/0121689 | A1 | 4/2022 | James et al. |
| 2022/0131953 | A1 | 4/2022 | Mann et al. |

\* cited by examiner

First Pass Processing

All Segments Processed in Parallel

Segment 1

| Input Events | Processed Events | Pending exchanges | Orphan Events | |
|---|---|---|---|---|
| CMD 1 | CMD 1 | CMD 1 | | Processed in this segment |
| DATA 1.1 | DATA 1.1 | CMD 1, DATA 1.1 | | Processed in this segment |
| CPL0 | | CMD 1, DATA 1.1 | | Orphan events in first segment are ignored |
| CMD 2 | CMD 2 | CMD 1, DATA 1.1 | | Processed in this segment |
| DATA 1.2 | DATA 1.2 | CMD 1, DATA 1.1 | | Processed in this segment |
| | | CMD 2 | | |

Pending exchanges on exit: CMD1, DATA 1.1, DATA 1.2, CMD2

- Pending exchange 1 saved for second pass
- Pending exchange 2 saved for second pass

Segment 2

| Input Events | Processed Events | Pending exchanges | Orphan Events | |
|---|---|---|---|---|
| CMD 3 | CMD 3 | CMD 3 | | Processed in this segment |
| DATA 1.3 | | CMD 3 | DATA 1.3 | Orphan event saved for second pass |
| CPL 1 | | CMD 3 | CPL 1 | Orphan event saved for second pass |
| DATA 3.1 | DATA 3.1 | CMD 3, DATA 3.1 | | Processed in this segment |
| DATA 2.1 | | CMD 3, DATA 3.1 | DATA 2.1 | Orphan event saved for second pass |
| CPL 3 | CPL 3* | CMD 3, DATA 3.1 | CPL 3 -> CPL 2 | *Processed in this segment and saved unused portion for second pass |
| CMD 4 | CMD 4 | | | |

Pending exchanges on exit: CMD 4

- Pending exchange 1 saved for second pass

FIG. 1D

| Input Events | Processed Events | Pending exchanges | Orphan Events | |
|---|---|---|---|---|
| | | Segment 3 | | |
| DATA 4.1 | | | DATA 4.1 | Orphan event saved for second pass |
| DATA 4.2 | | | DATA 4.2 | Orphan event saved for second pass |
| CMD 5 | CMD 5 | | | Processed in this segment |
| DATA 5.1 | DATA 5.1 | CMD 5 | | Processed in this segment |
| DATA 5.2 | DATA 5.2 | CMD 5 | | Processed in this segment |
| CPL 5 | CPL 5* | CMD 5 | CPL 5-> CPL 4 | *Processed in this segment and saved unused portion for second pass |

Pending exchanges on exit: None

Second Pass Processing

| Input Events | Processed Events | Pending exchanges | | |
|---|---|---|---|---|
| | | Processing Second Segment Orphans with First Segment Pending | | |
| DATA 1.3 | DATA 1.3 | CMD 1, DATA 1.2, DATA 1.2 | | Data matches with pending from first segment |
| CPL 1 | CPL 1 | CMD 1, DATA 1.2, DATA 1.2, DATA 1.3 | | CPL applied to pending, clears out this exchange |
| DATA 2.1 | | CMD 2 | | Data matches with pending CMD 2 |
| CPL 2 | | CMD 2, DATA 2.1 | | CPL applied to pending, clears out this exchange |

Pending exchanges on exit: None

| Input Events | Processed Events | Pending exchanges | | |
|---|---|---|---|---|
| | | Processing Third Segment Orphans with First Segment Pending and any remaining from previous process | | |
| DATA 4.1 | DATA 4.1 | CMD 4 | | Data matches with pending from second segment |
| DATA 4.2 | DATA 4.2 | CMD 4, DATA 4.1 | | Data matches with pending from second segment |
| CPL 4 | CPL 4 | CMD 4, DATA 4.1 | | CPL applied to pending clears out this exchange |

Pending exchanges on exit: None

FIG. 1E

KEY
Shaded rows represent orphan events that complete the exchange on second pass
c(n) = command
s(n) = status completeing an exchange (only completes the exchange with that same number)

| Segment | Timestamp | Event | SEGMENT COUNTS | | WHOLE TRACE COUNTS | | Difference (Offset) | Stored Table Offsets |
|---|---|---|---|---|---|---|---|---|
| | | | Segment Pending Exchs | Segment Pend Count | Trace Pending Exchs | Trace Pending Count | | |
| Segment 1 | 1 | c1 | | 0 | | 0 | 0 | 0 |
| | 2 | c2 | c1, | 1 | c1 | 1 | 0 | 0 |
| | 3 | c3 | c1,c2 | 2 | c1,c2 | 2 | 0 | 0 |
| | 4 | s3 | c1,c2,c3 | 3 | c1,c2,c3 | 3 | 0 | 0 |
| | | | c1,c2 | 2 | c1,c2 | 2 | 0 | 0 |
| *Offset for start of next segment is the offset for this segment = 2* | | | | | | | | |
| Segment 2 | 5 | s1 | | 0 | c1,c2 | 2 | 2 | 2 |
| | 6 | c4 | | 0 | c2 | 1 | 1 | 1 |
| | 7 | s2 | c4 | 1 | c2,c4 | 2 | 1 | 1 |
| | 8 | s4 | c4 | 1 | c4 | 1 | 0 | 0 |
| | 9 | c5 | | 0 | | 0 | 0 | 0 |
| | 10 | c6 | c5, | 1 | c5, | 1 | 0 | 0 |
| | 11 | s5 | c5,c6 | 2 | c5,c6 | 2 | 0 | 0 |
| | 12 | c7 | c6 | 1 | c6 | 1 | 0 | 0 |
| | 13 | c8 | c6,c7 | 2 | c6,c7 | 2 | 0 | 0 |
| | | | c6,c7,c8 | 3 | c6,c7,c8 | 3 | 0 | 0 |
| *Offset for start of next segment is the offset for this segment (3) plus second pass* | | | | | | | | |
| Segment 3 | 14 | c9 | | 0 | c6,c7,c8 | 3 | 3 | 3 |
| | 15 | c10 | c9 | 1 | c6,c7,c8, c9 | 4 | 3 | 3 |
| | 16 | s6 | c9, c10 | 2 | c6,c7,c8, c9,c10 | 5 | 3 | 3 |
| | 17 | c11 | c9,c10 | 2 | c7,c8, c9,c10 | 4 | 2 | 2 |
| | 18 | s7 | c9,c10,c11 | 3 | c7,c8, c9,c10,c11 | 5 | 2 | 2 |
| | | | c9,c10,c11 | 3 | c8, c9,c10,c11 | 4 | 1 | 1 |
| *Offset for start of next segment is the offset for this segment (3) plus second pass* | | | | | | | | |
| Segment 4 | 19 | s11 | | 0 | c8, c9,c10,c11 | 4 | 4 | 4 |
| | 20 | c12 | | 0 | c8, c9,c10 | 3 | 3 | 3 |
| | 21 | s8 | c12 | 1 | c8, c9,c10,c12 | 4 | 3 | 3 |
| | 22 | Reset | c12 | 1 | c9,c10,c12 | 3 | 2 | 2 |
| | | | | 0 | | 0 | 0 | 0 |

Offset Table

| Timestamp | Offset |
|---|---|
| 1 | 0 |
| 5 | 2 |
| 6 | 1 |
| 8 | 0 |
| 14 | 3 |
| 17 | 2 |
| 18.1 | 1 |
| 19 | 4 |
| 20 | 3 |
| 22 | 2 |
| 22.1 | 0 |

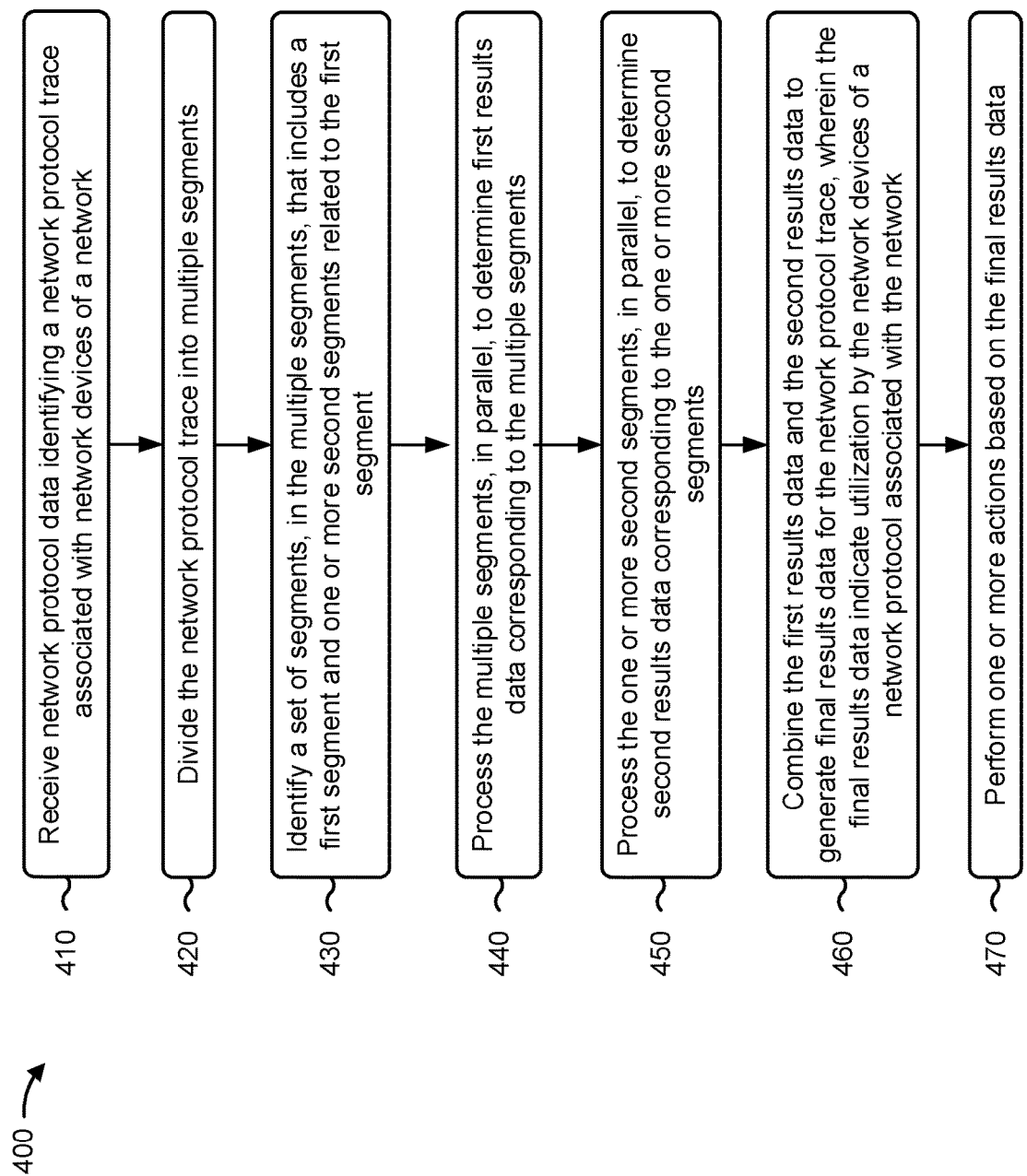

ANALYZING NETWORK DATA FOR DEBUGGING, PERFORMANCE, AND IDENTIFYING PROTOCOL VIOLATIONS USING PARALLEL MULTI-THREADED PROCESSING

RELATED APPLICATION

This application is a continuation of U.S. patent application Ser. No. 16/949,397, filed Oct. 28, 2020, which is incorporated herein by reference in its entirety.

BACKGROUND

A network protocol is a set of established rules that dictate how to format, transmit, and receive data so that network devices (e.g., routers, switches, and/or the like) can communicate regardless of differences in underlying infrastructures, designs, and/or standards associated with the network devices.

SUMMARY

In some implementations, a method may include receiving network protocol data identifying a network protocol trace associated with network devices of a network, and dividing the network protocol trace into multiple segments. The method may include identifying a set of segments, in the multiple segments, that includes a first segment and one or more second segments related to the first segment, and processing the multiple segments, in parallel, to determine first results data corresponding to the multiple segments. The method may include processing the one or more second segments, in parallel, to determine second results data corresponding to the one or more second segments, and combining the first results data and the second results data to generate final results data for the network protocol trace, wherein the final results data indicate utilization by the network devices of a network protocol associated with the network. The method may include performing one or more actions based on the final results data.

In some implementations, a device may include one or more processors to receive network protocol data identifying a network protocol trace associated with network devices of a network, and divide the network protocol trace into multiple segments based on a quantity of data in the network protocol trace. The one or more processors may identify a set of segments, in the multiple segments, that includes a first segment and one or more second segments related to the first segment, wherein the first segment includes a command associated with the network protocol, and wherein the one or more second segments include data associated with the command and/or another command with data in the second segments or in subsequent segments. The one or more processors may process the multiple segments, in parallel, to determine first results data corresponding to the multiple segments, and may process the one or more second segments, in parallel, to determine second results data corresponding to the one or more second segments. The one or more processors may combine the first results data and the second results data to generate final results data for the network protocol trace, wherein the final results data indicate utilization by the network devices of a network protocol associated with the network, and may perform one or more actions based on the final results data.

In some implementations, a non-transitory computer-readable medium may store one or more instructions that, when executed by one or more processors of a device, cause the device to receive network protocol data identifying a network protocol trace associated with network devices of a network, and divide the network protocol trace into multiple segments. The one or more instructions may cause the device to identify a set of segments, in the multiple segments, that includes a first segment and one or more second segments related to the first segment, and process the multiple segments, in parallel, to determine first results data corresponding to the multiple segments. The one or more instructions may cause the device to process the one or more second segments, in parallel, to determine second results data corresponding to the one or more second segments, and combine the first results data and the second results data to generate final results data for the network protocol trace, wherein the final results data indicate utilization by the network devices of a network protocol associated with the network. The one or more instructions may cause the device to debug, identify a performance of, or identify protocol violations of a particular network device, of the network devices, based on the final results data, and cause the particular network device to be serviced.

BRIEF DESCRIPTION OF THE DRAWINGS

FIGS. 1A-1J are diagrams of one or more example implementations described herein.

FIG. 4 is a flow chart of an example process for analyzing network data for debugging, performance, and identifying protocol violations using parallel multi-threaded processing.

DETAILED DESCRIPTION

Figure 1A:
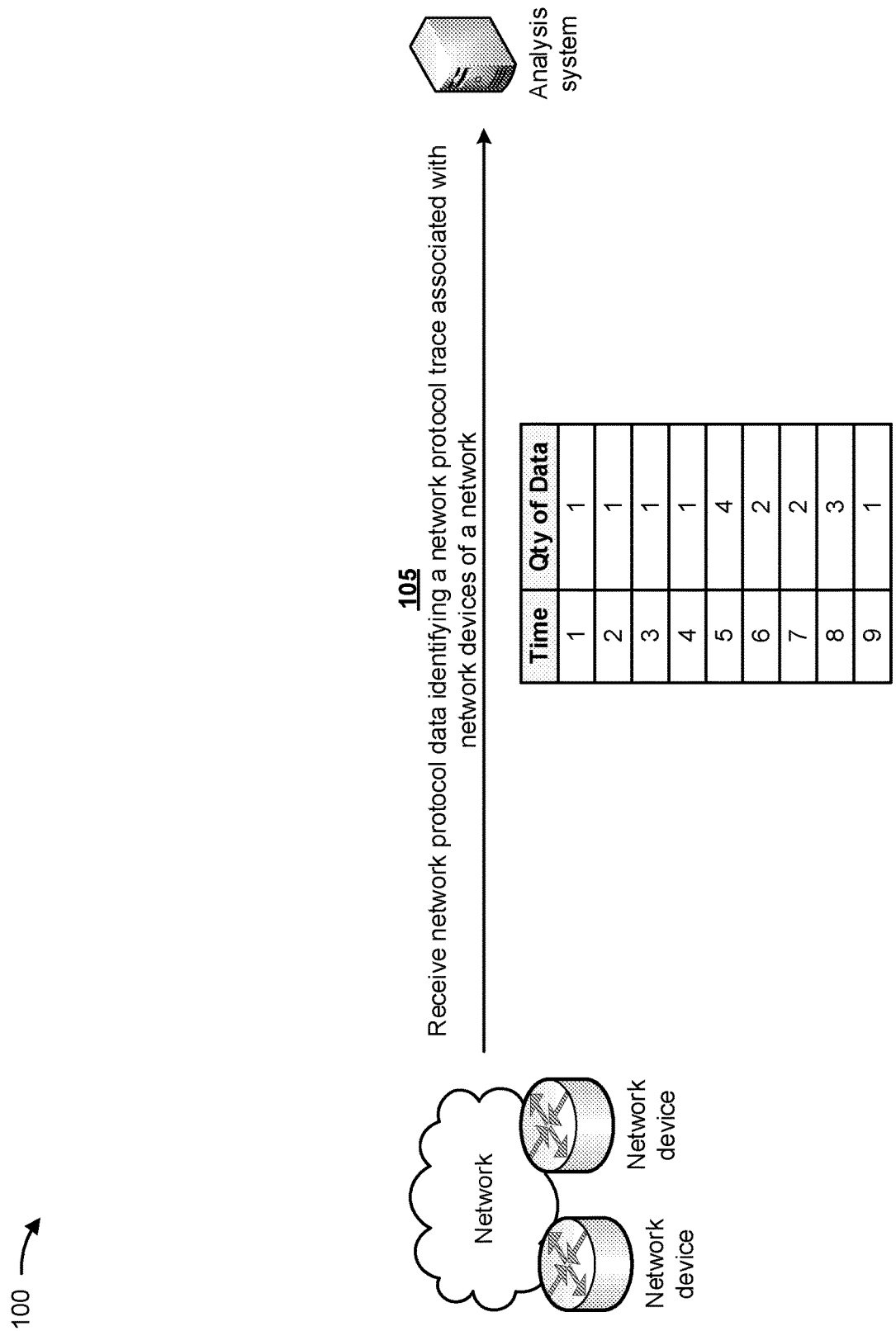

The following detailed description of example implementations refers to the accompanying drawings. The same reference numbers in different drawings may identify the same or similar elements.

Network data from network devices may be analyzed to determine whether a network protocol is being utilized properly by hardware components of the network devices. The network data may include network protocol traces. As network transmission speeds increase, sizes of the network protocol traces also increase. This results in a large amount of data that needs to be processed when analyzing the network protocol traces. Processing and analyzing the network protocol traces requires an undesirable amount of time. This, in turn, wastes computing resources (e.g., processing resources, memory resources, communication resources, and/or the like), networking resources, and/or the like associated with identifying network devices violating the network protocol, debugging the network devices violating the network protocol, determining performances of the network devices violating the network protocol, and/or the like.

Some implementations described herein provide an analysis system that analyzes network data for debugging, performance, and identifying protocol violations using parallel multi-threaded processing. For example, the analysis system may receive network protocol data identifying a network protocol trace associated with network devices of a network, and may divide the network protocol trace into multiple segments. The analysis system may identify a set of segments, in the multiple segments, that includes a first segment and one or more second segments related to the first segment, and may process the multiple segments, in parallel, to determine first results data corresponding to the multiple segments. The analysis system may process the one or more second segments, in parallel, to determine second results data corresponding to the one or more second segments, and may combine the first results data and the second results data to generate final results data for the network protocol trace. The final results data may indicate utilization by the network devices of a network protocol associated with the network. The analysis system may perform one or more actions based on the final results data.

In this way, the analysis system analyzes network data for debugging, performance, and identifying protocol violations using parallel multi-threaded processing. The analysis system may divide a network protocol trace (e.g., recorded network data, such as packets, commands, frames, and/or the like) into multiple segments, and may process the multiple segments in parallel. The analysis system may combine results of processing the multiple segments to generate the entire network protocol trace. By dividing the network protocol trace into the multiple segments, and processing each segment at the same time (e.g., each with its own thread), a quantity of time required to completely process the network protocol trace is reduced significantly. Thus, the analysis system conserves computing resources, networking resources, and/or the like that would otherwise have been wasted in identifying network devices violating the network protocol, debugging the network devices violating the network protocol, determining performances of the network devices violating the network protocol, and/or the like.

FIGS. 1A-1J are diagrams of one or more example implementations 100 associated with analyzing network data for debugging, performance, and identifying protocol violations using parallel multi-threaded processing. As shown in FIGS. 1A-1J, example implementations 100 include a network with network devices, and an analysis system. The network may include one or more wired and/or wireless networks. Each network device may include a device capable of receiving, processing, storing, routing, and/or providing traffic (e.g., a packet, other information or metadata, and/or the like) in a manner described herein. The analysis system may include a system that analyzes network data for debugging, performance, and identifying protocol violations using parallel multi-threaded processing.

As further shown in FIG. 1A, and by reference number 105, the analysis system may receive network protocol data identifying a network protocol trace associated with the network devices of the network. In some implementations, the analysis system receives the network protocol data from a network analyzer (e.g., a capture device) provided between two or more communicating network devices. In some implementations, the analysis system is provided between two or more communicating network devices (e.g., function as a capture device) in order to capture the network protocol data. The network protocol trace may include network data recorded by the network devices, such as packets transmitted and/or received by the network devices, commands processed, transmitted, and/or received by the network devices, frames transmitted and/or received by the network devices, and/or the like, over time periods. As further shown in FIG. 1A, the network protocol trace may include data identifying time periods and quantities of data processed during the time periods. For example, during the first time period, one unit of data (e.g., one packet, one frame, one bit, one megabit, and/or the like) may be processed by the network devices; during the fifth time period, four units of data may be processed by the network devices; during the sixth time period, two units of data may be processed by the network devices; and/or the like.

Figure 1B:
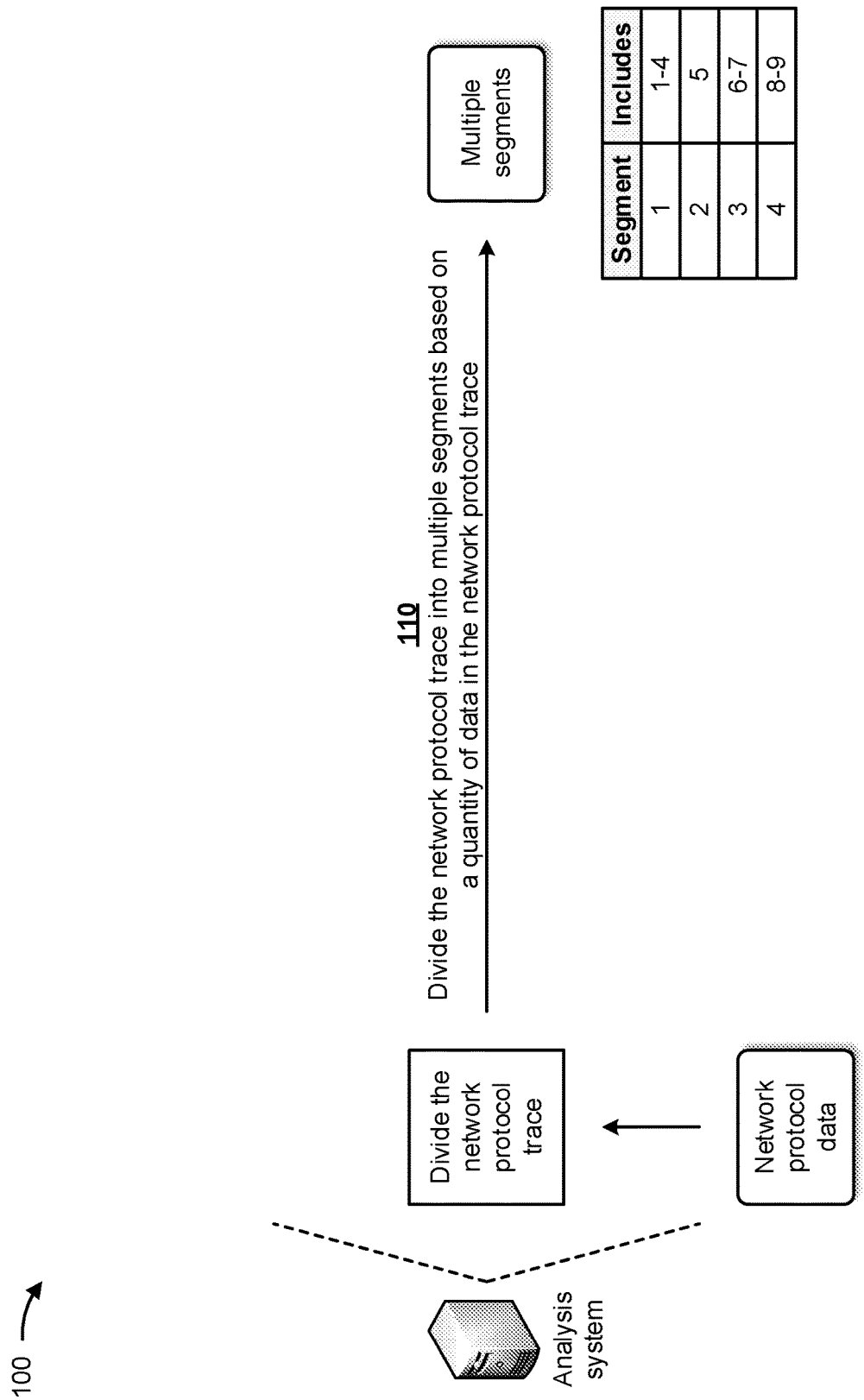

As shown in FIG. 1B, and by reference number 110, the analysis system may divide the network protocol trace into multiple segments based on a quantity of data in the network protocol trace. In some implementations, the analysis system may divide the network protocol trace into multiple segments so that processing of the network protocol trace may be evenly distributed among processors of the analysis system, and so that processing each of the multiple segments may require approximately a same amount of time. Since the network protocol trace may include different quantities of data at different time periods (e.g., due to the nature of network data), dividing the network protocol trace into equal segments based on time periods will not result in evenly distributing the network protocol trace among the processors of the analysis system.

In some implementations, in order to evenly distribute the network protocol trace among the processors of the analysis system, the analysis system may divide the network protocol trace into the multiple segments based on a quantity of data (e.g., a density of data) in the network protocol trace. For example, based on the network protocol trace shown in FIG. 1A, the analysis system may determine that the network protocol trace includes sixteen (16) units of data based on adding the units of data in the quantities of data column. If the network protocol trace is to be divided into four equivalent segments, the analysis system may divide the total units of data (e.g., sixteen) by the desired number of segments (e.g., four) to determine that each segment is to be allotted four units of data. Thus, the analysis system may group the first four time periods of the network protocol trace into a first segment (e.g., since the first four time periods each are associated with one unit of data); may designate the fifth time period of the network protocol trace as a second segment (e.g., since the fifth time period is associated with four units of data); may group the sixth time period and the seventh time period into a third segment (e.g., since the sixth time period and the seventh time period each are associated with two units of data); and may group the eighth time period and the ninth time period into a fourth segment (e.g., since the eighth time period and the ninth time period are associated with three units of data and one unit of data, respectively). The resulting segments and the corresponding time periods are depicted in the table in FIG. 1B.

Figure 1C:
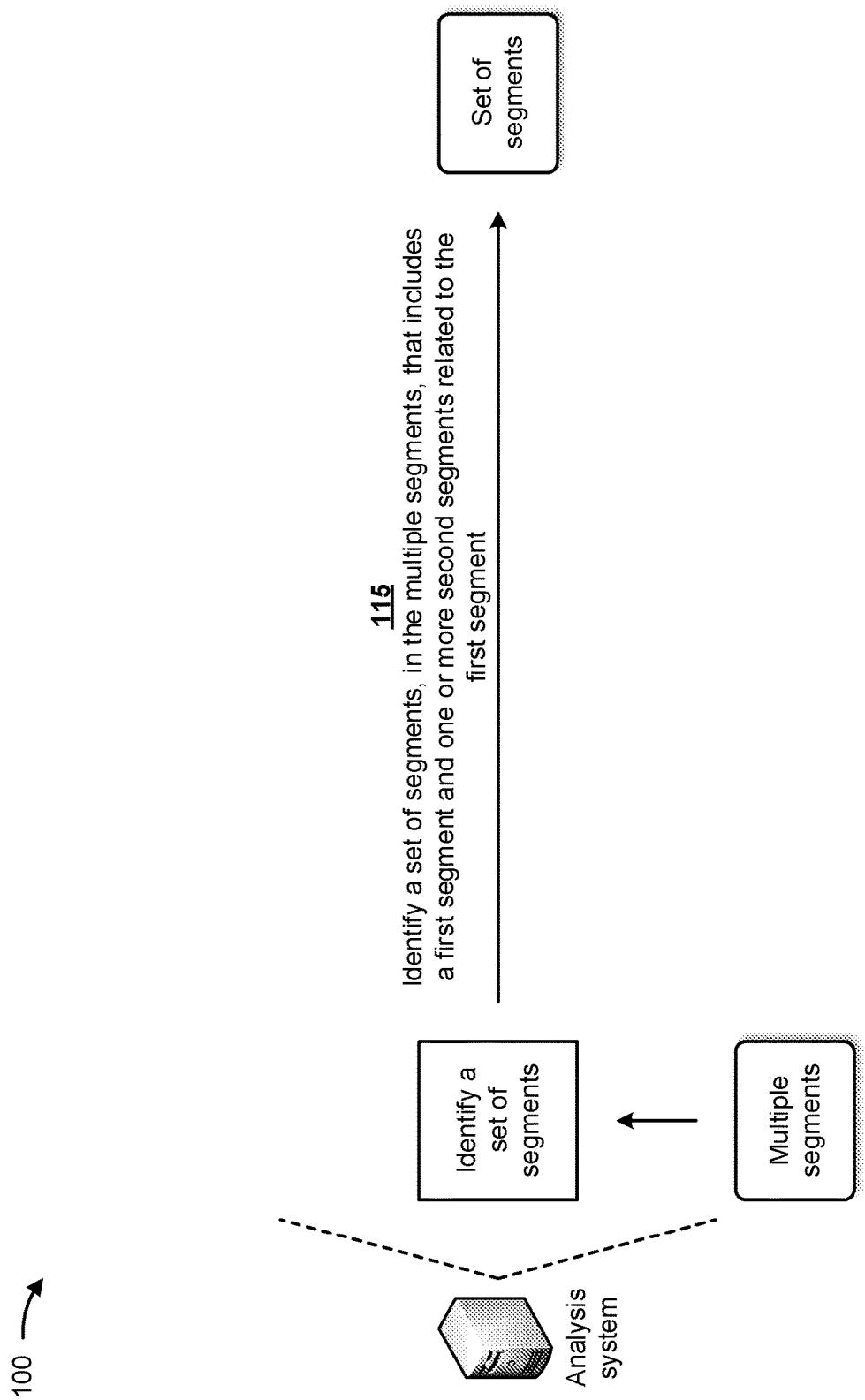

As shown in FIG. 1C, and by reference number 115, the analysis system may identify a set of segments, in the multiple segments, that include a first segment and one or more second segments related to the first segment. In some implementations, the network protocol trace may include an exchange (e.g., a conversation), and the portions of the exchange may be split across the multiple segments. The analysis system may handle situations where the portions of the exchange cross boundaries of the multiple segments. An exchange may include events, such as a command CMD, a sequence of data frames DATA(n) (e.g., which may be from 1 to n), and a completion CPL(n) that identifies completed exchanges. The CPL(n) may indicate completion of all exchanges up to an nth exchange. If an CPL(n) in a segment is partially processed, the analysis system may partially save the CPL(n) as an orphan event. The analysis system may save a subset of the CPL(n) that is not within the segment to be reprocessed in the second phase of processing (e.g., as an orphan event). If the network protocol trace is divided into two or more segments, the three types of events of an exchange may occur on different segments of the network protocol trace.

If the processors of the analysis system are independently processing the segments of the network protocol trace, and the command is located in a first segment and the data and/or the completion is located in a second segment, the processor of the analysis system that is processing the second segment will not know that the command is located in the first segment and will not know how to process the data and/or the completion. In this situation, the data and/or the completion may be referred to as pending exchanges or orphan events. The analysis system may partially process or save the pending exchanges without any action, depending on the type of command.

In order to correctly process the pending exchanges, the analysis system may save the pending exchanges in a segment (e.g., the second segment) in time order. The analysis system may process the pending exchanges based on processing a previous segment (e.g., the first segment with the command) and after processing all non-pending exchanges in the previous segment. When the analysis system has completed processing the previous segment, the analysis system may save state information associated with exchanges that are partially processed (e.g., that have been started but not completed). The exchanges that are partially processed may be referred to as pending exchanges, and the state information and the pending exchanges may be referred to as an exit state.

When the analysis system completes processing the first segment, the analysis system may utilize the exit state as a starting state to process the pending exchanges for the second segment. This may be referred to as a cleanup phase or a second pass. The analysis system may utilize state information of the second segment and pending exchanges from the second segment (e.g., remaining pending exchanges after processing the pending exchanges from the second segment) as a second exit state for processing pending exchanges from a third segment. The analysis system may continue this process until all of the multiple segments of the network protocol trace are processed by the analysis system.

FIGS. 1D and 1E provide an example of processing performed by the analysis system when exchanges are split among the multiple segments. As shown, first pass processing may include processing events in three segments (e.g., a first segment, a second segment, and a third segment). Second pass processing may include processing second segment pending exchanges with the first segment pending, and processing third segment pending exchanges with the first segment pending and any remaining pending exchanges from the second segment.

Figure 1F:
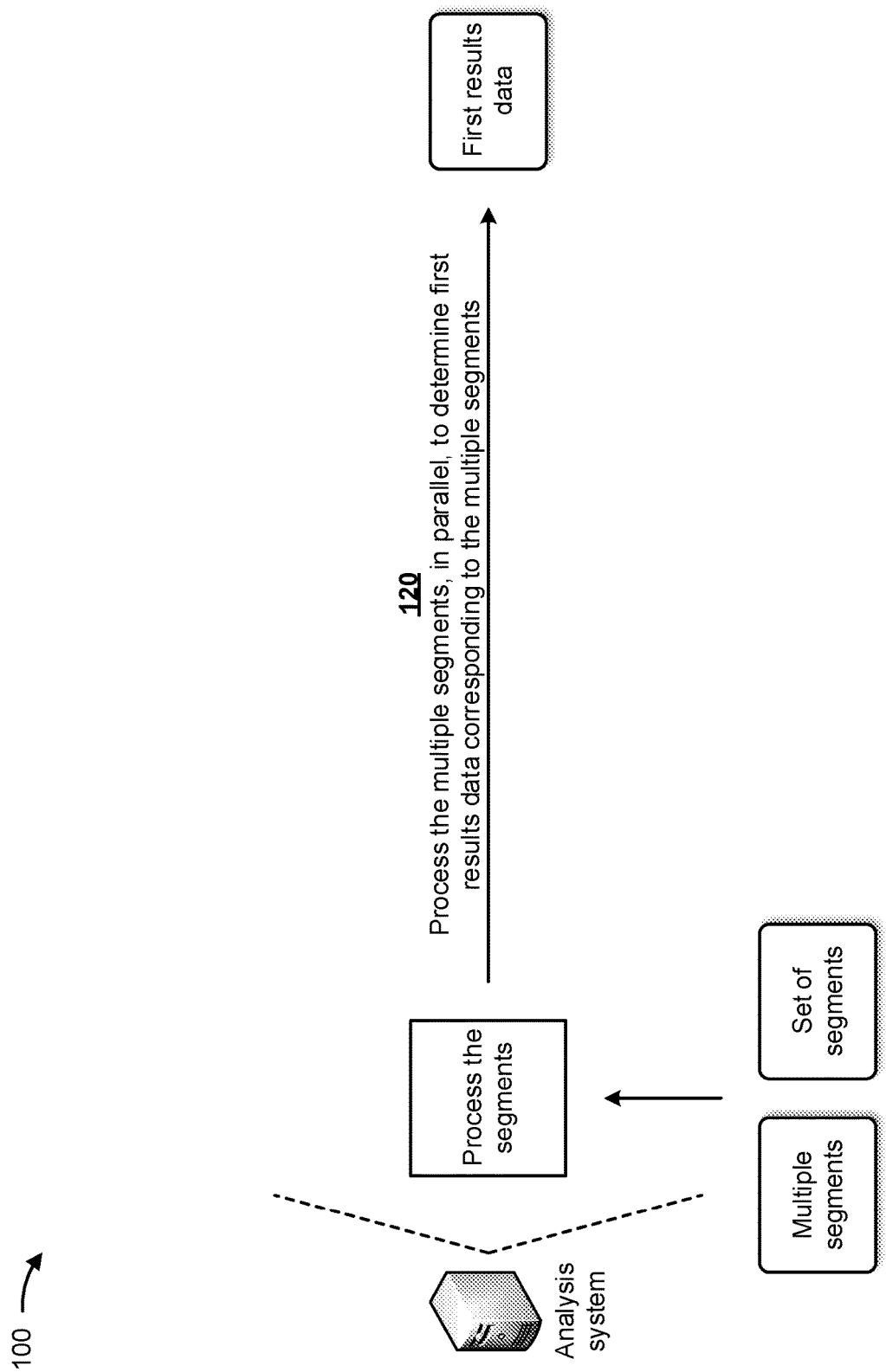

As shown in FIG. 1F, and by reference number 120, the analysis system may process the multiple segments, in parallel, to determine first results data corresponding to the multiple segments. For example, the analysis system may include multiple processors and each of the multiple processors may process one of the multiple segments, in parallel with the remaining processors, to determine the first results data. Processing the multiple segments in parallel may significantly reduce a quantity of time required to completely process the network protocol trace. In some implementations, the first results may include data identifying network protocol usage by the network devices (e.g., proper or improper network protocol usage), performance indicators associated with the network devices (e.g., throughput performance, bandwidth, errors, and similar indicators), and/or the like.

Figure 1G:
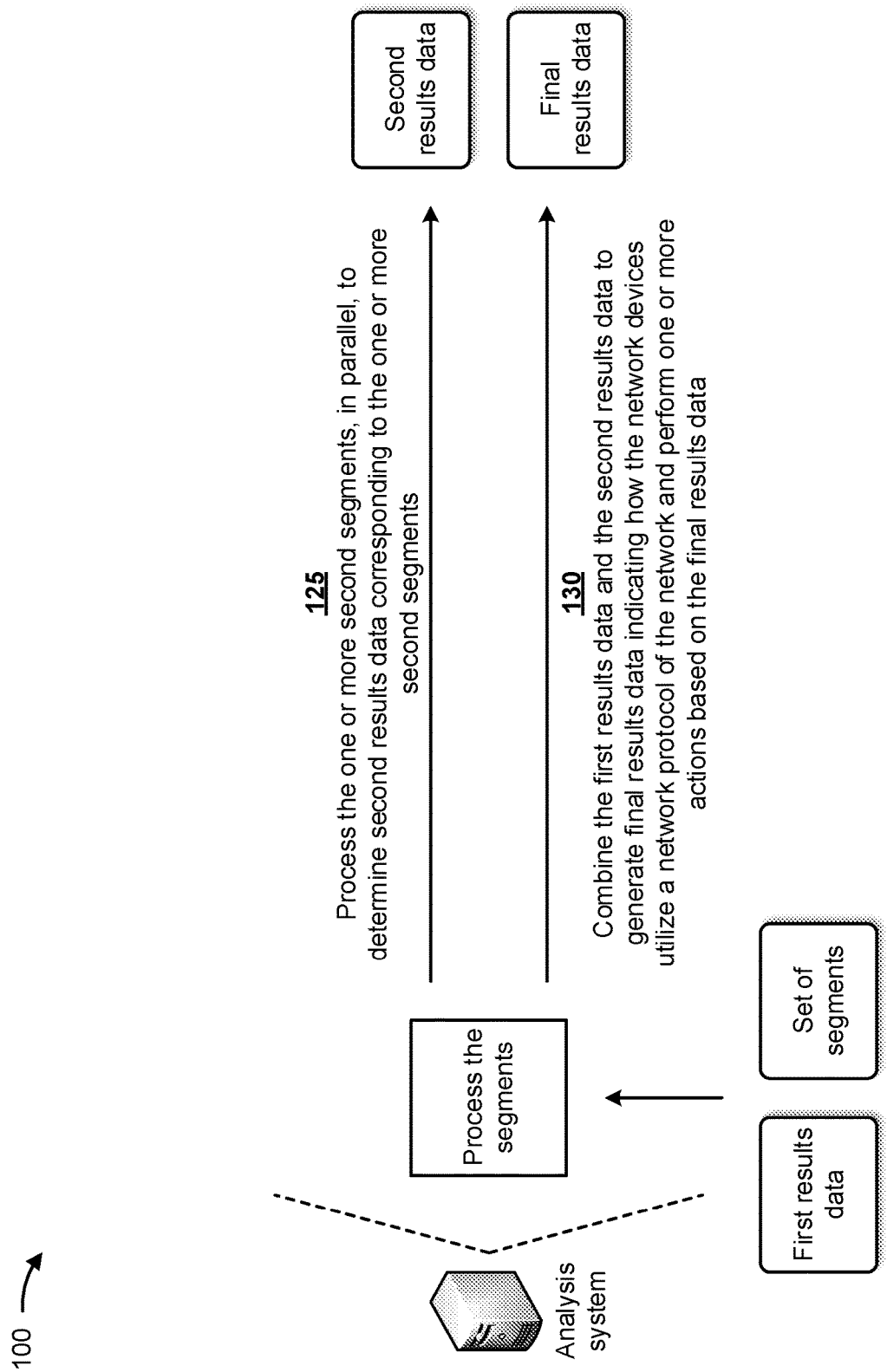

As shown in FIG. 1G, and by reference number 125, the analysis system may process the one or more second segments, in parallel, to determine second results data corresponding to the one or more second segments. For example, each of the multiple processors of the analysis system may process one of the one or more second segments, in parallel with the first segment, with the remaining processors, to determine the second results data. Processing the one or more second segments in parallel may significantly reduce a quantity of time required to completely process the network protocol trace. In some implementations, the second results may include data identifying network protocol usage by the network devices (e.g., based on the one or more second segments), performance indicators associated with the network devices (e.g., based on the one or more second segments), and/or the like.

As further shown in FIG. 1G, and by reference number 130, the analysis system may combine the first results data (e.g., a first pass of all segments) and the second results data (e.g., a second pass of remaining segments) to generate final results data indicating how the network devices utilize the network protocol of the network and may perform one or more actions based on the final results data. In some implementations, the final results may include data identifying network protocol usage by the network devices (e.g., based on all of the multiple segments or the complete network protocol trace), performance indicators associated with the network devices (e.g., based on all of the multiple segments or the complete network protocol trace), and/or the like.

Performing the one or more actions may include the analysis system identifying a particular network device, of the network devices, that is improperly utilizing the network protocol (e.g., performing protocol violations). For example, the analysis system may determine that a particular network device is causing a delay in the network due to improperly utilizing the network protocol. The analysis system may attempt to service the particular network device by correcting the improper utilization of the network protocol (e.g., via a software fix, a software update, and/or the like). Furthermore, the analysis system may debug the particular network device and/or determine a performance of the particular network device with respect to the protocol. This, in turn, may eliminate or reduce the delay in the network and conserve computing resources, networking resources, and/or the like.

Performing the one or more actions may include the analysis system dispatching an autonomous vehicle or a technician to service the particular network device. For example, the analysis system may instruct an autonomous vehicle (e.g., a drone, a robot, and/or the like) to travel to the particular network device and perform service on the particular network device. Alternatively, or additionally, the analysis system may provide a message instructing a technician to travel to the particular network device and perform service on the particular network device. This, in turn, may eliminate or reduce the delay in the network and conserve computing resources, networking resources, and/or the like.

Performing the one or more actions may include ordering a replacement network device for the particular network device. For example, the analysis system may automatically place an order for the replacement network device to expedite replacing the particular network device. The replacement network device may be installed in the network and may properly utilize the network protocol. This, in turn, may eliminate or reduce the delay in the network and conserve computing resources, networking resources, and/or the like.

Performing the one or more actions may include reprogramming the particular network device that violates the network protocol. For example, the analysis system may cause the particular network device to be reprogrammed so that the particular network device does not violate the network protocol. This, in turn, may eliminate or reduce the delay in the network and conserve computing resources, networking resources, and/or the like.

Figure 1H:
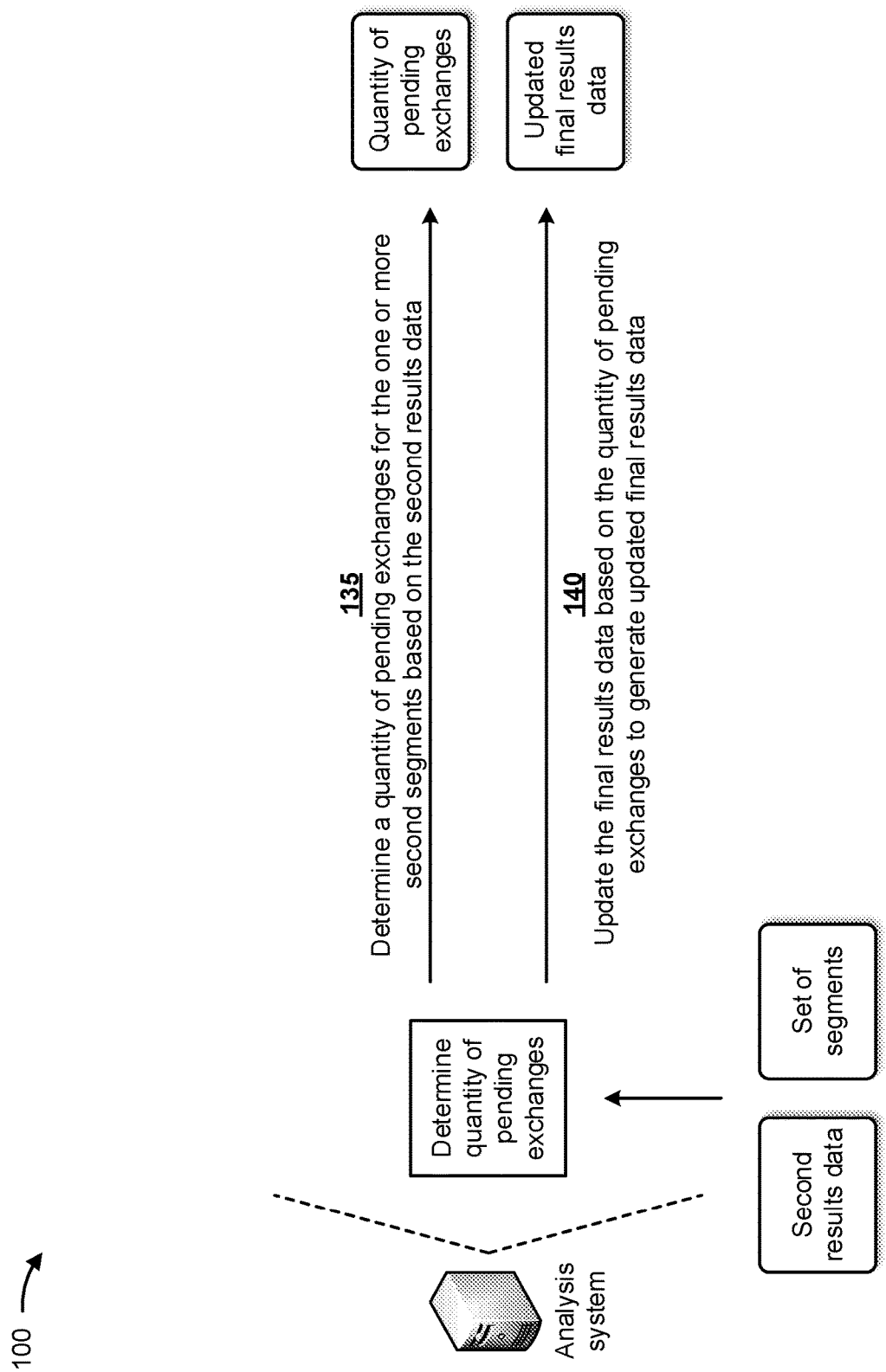

As shown in FIG. 1H, and by reference number 135, the analysis system may determine a quantity of pending exchanges for the one or more second segments based on the second results data. For example, the analysis system may determine a quantity of pending exchanges across the multiple segments. When processing the network protocol trace independently in the multiple segments, the analysis system may generate events in segments that are unaware of pending exchanges that started in a previous segment. As described above, data and status events that do not correspond to a command in that same segment (e.g., because the command is in a previous segment) are referred to as pending exchanges. The analysis system may save the pending exchanges in an order of occurrence in the network protocol trace and may process the pending exchanges in a second pass of processing, as described above in connection with FIGS. 1C-1E.

In some implementations, the analysis system may determine a quantity of pending exchanges at each command, status, reset, and/or the like. In the second pass processing, the analysis system may start with the pending exchanges from an end of a first segment and may process all pending exchanges in a second segment. Once all of the pending exchanges from the second segment are processed, the analysis system may add the pending exchanges from the end of the second segment to any remaining pending exchanges from the first segment and may process all of the pending exchanges from the third segment. The analysis system may continue this process until all of the pending exchanges in every segment are processed.

During the first pass processing, for each command, status, and reset, the analysis system may record a quantity of pending exchanges for end points in a conversation or exchange (e.g., an initiator, target, or logical unit numbers (ITL) event). The quantity of pending exchanges for the same event may be useful information for debugging the network protocol trace. However, since information for pending exchanges that started in previous segments is unavailable, the recorded quantity of pending exchanges may be incorrect.

Since during the first pass processing the analysis system cannot record an accurate quantity of pending exchanges for command and status events in segments beyond the first segment, the analysis system may recalculate the quantity of pending exchanges in the second pass processing by creating offset counts in the second pass processing. The analysis system may start with a pending exchange list at a beginning of a segment and may create an offset table for a quantity of pending exchanges for each ITL with a same start time. Whenever a pending exchange, that would complete an exchange from a previous segment, is processed, the analysis system may decrement an offset count for that ITL and may store the decremented offset count in the offset table with a time associated with the pending exchange. Before starting each segment, the analysis system may create a new offset count by reviewing pending events of the previous segment and adding a pending count for each ITL to a current offset count to create the new offset count for a start of a next segment. At the end of the second pass processing, the analysis system may generate an offset table for each ITL, with a timestamp and an offset count. To calculate the correct pending count for any command, status, and/or reset in the network protocol trace, the analysis system may query the offset table with an ITL to obtain the offset count. The analysis system may add the offset count to a recorded pending exchange count to obtain a correct pending exchange count.

As further shown in FIG. 1H, and by reference number 140, the analysis system may update the final results data based on the quantity of pending exchanges to generate updated final results data. For example, the analysis system may update the final results data based on the offset table created by the analysis system. This may ensure that the analysis system is utilizing an accurate quantity of pending exchanges for command and status events in segments when determining the final results.

FIG. 1I provides an example of processing performed by the analysis system to generate the offset table that is utilized to determine an accurate quantity of pending exchanges for command and status events in segments. As shown, the analysis system may process four segments with command and status events, and may maintain counts for the entire network protocol trace. The analysis system may determine segment pending exchanges, segment pending exchange counts, trace pending exchanges, trace pending counts, offsets, and/or the like, and may generate the offset table based on the determined information.

Figure 1J:
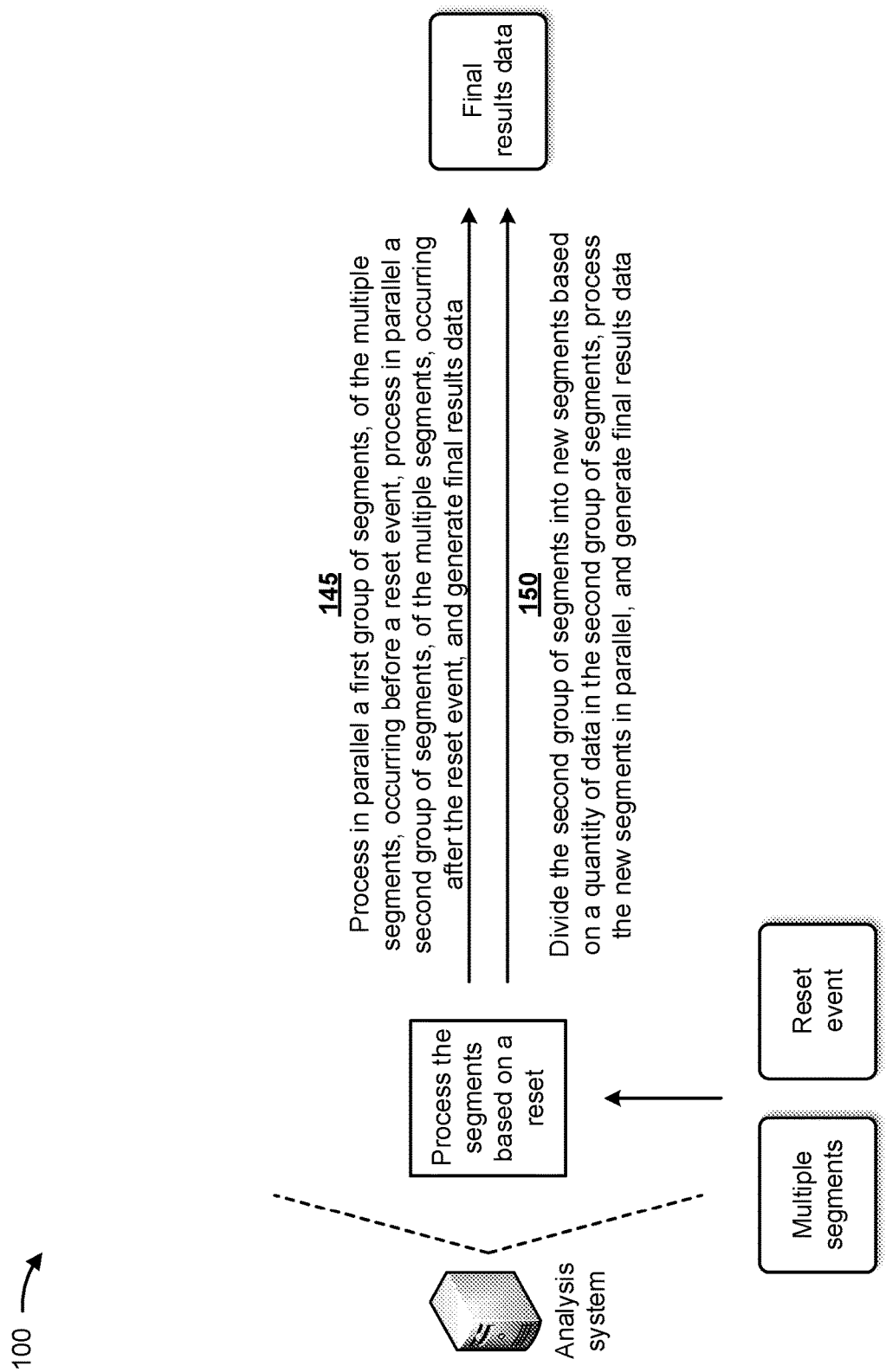

As shown in FIG. 1J, and by reference number 145, the analysis system may process in parallel a first group of segments, of the multiple segments, occurring before a reset event, may process in parallel a second group of segments, of the multiple segments, occurring after the reset event, and may generate the final results data based on the processing of the first group of segments and the second group of segments. A reset event may remove state information from one or more network devices and may cause the one or more network devices to enter an initialized state. When processing of the network protocol trace first starts, the analysis system may initialize a state of each segment with information from a bootup of the network (e.g., information identifying memory addresses of the network devices). If segments occurring after a segment in which a reset occurs are processed based on information that is no longer valid (e.g., based on the information from the initial bootup), the analysis of the network protocol trace may be inaccurate.

In some implementations, the analysis system may preprocess the network protocol trace, may identify locations of resets in the network protocol trace, and may arrange the segments around the resets. For full processor utilization by the analysis system and optimal performance, the analysis system may not process segments after the resets until the resets have completed. Once a reset has completed, the analysis system may process the segments after the reset, in parallel, to complete the first pass processing. The analysis system may perform the second pass processing to complete the analysis of the network protocol trace.

Alternatively, and as further shown in FIG. 1J by reference number 150, the analysis system may divide the second group of segments into new segments based on a quantity of data in the second group of segments, may process the new segments in parallel, and may generate the final results data based on the processing of the first group of segments and the new segments. For example, when a particular segment includes a reset event, the analysis system may cease processing of segments after the particular segment. The analysis system may cease processing of segments after the particular segment until the network has completed the reset, and may divide the segments after the particular segment into new equal segments from that point. The analysis system may process the new segments with an updated starting state (e.g., a state occurring after the reset).

In this way, the analysis system analyzes network data for debugging, performance, and identifying protocol violations using parallel multi-threaded processing. The analysis system may divide a network protocol trace (e.g., recorded network data, such as packets, commands, frames, and/or the like) into multiple segments, and may process the multiple segments in parallel, which significantly reduces a quantity of time required to completely process the network protocol trace. Thus, the analysis system conserves computing resources, networking resources, and/or the like that would otherwise have been wasted in identifying network devices violating the network protocol, debugging the network devices violating the network protocol, determining performances of the network devices violating the network protocol, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
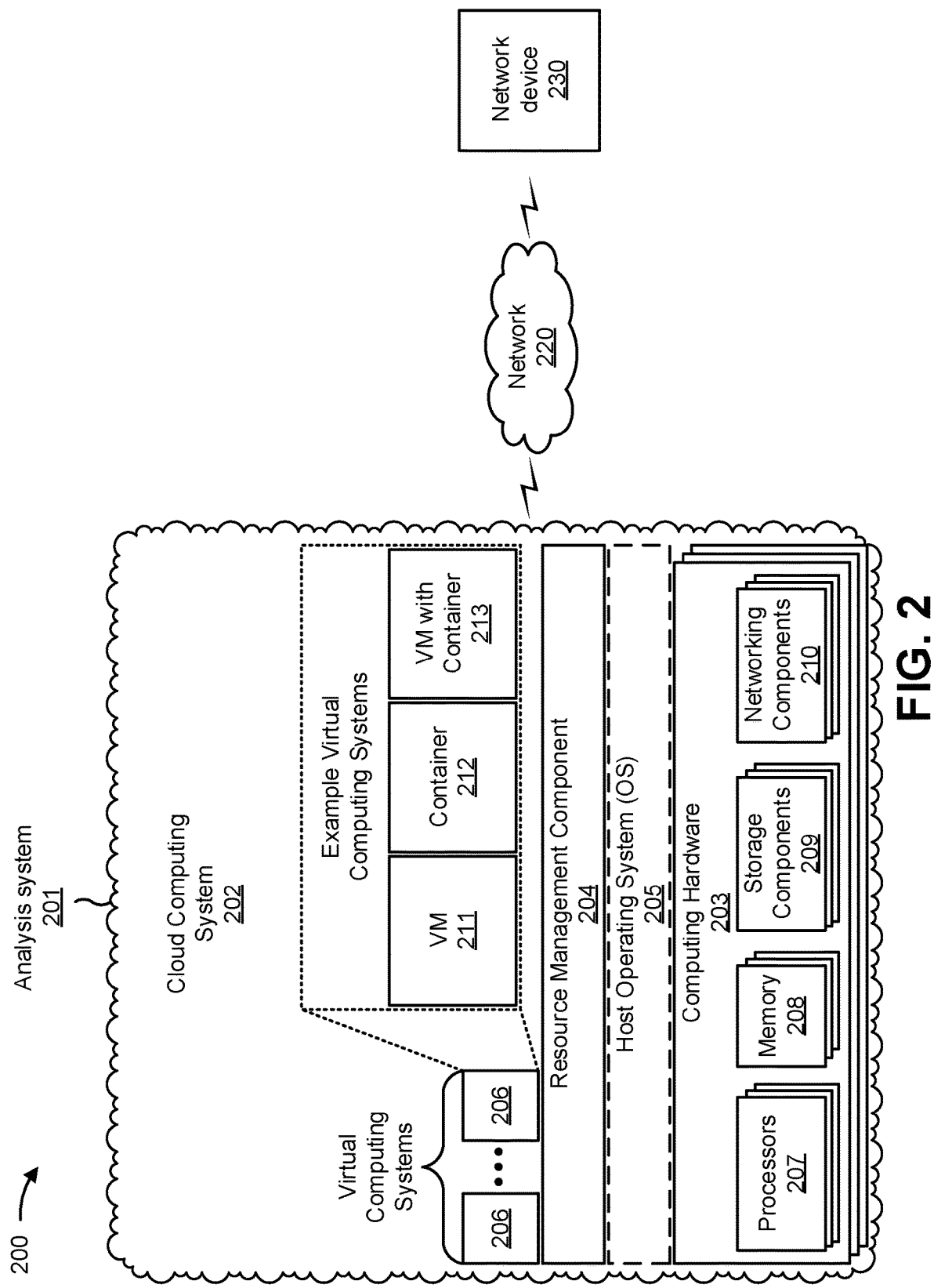
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an analysis system 201, which may include one or more elements of and/or may execute within a cloud computing system 202. The cloud computing system 202 may include one or more elements 203-213, as described in more detail below. As further shown in FIG. 2, environment 200 may include a network 220, and a network device 230. Devices and/or elements of environment 200 may interconnect via wired connections and/or wireless connections.

Cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although analysis system 201 may include one or more elements 203-213 of the cloud computing system 202, may execute within the cloud computing system 202, and/or may be hosted within the cloud computing system 202, in some implementations, analysis system 201 may not be cloud-based (e.g., may be implemented outside of a cloud computing system) or may be partially cloud-based. For example, analysis system 201 may include one or more devices that are not part of the cloud computing system 202, such as device 300 of FIG. 3, which may include a standalone server or another type of computing device. Analysis system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Network device 230 includes one or more devices capable of receiving, processing, storing, routing, and/or providing traffic (e.g., a packet, other information or metadata, and/or the like) in a manner described herein. For example, network device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 230 may include a gateway, a switch, a firewall, a hub, a bridge, a reverse proxy, a server (e.g., a proxy server, a cloud server, a data center server, and/or the like), a load balancer, and/or a similar device. In some implementations, network device 230 may be a physical device implemented within a housing, such as a chassis. In some implementations, network device 230 may be a virtual device implemented by one or more computing devices of a cloud computing environment or a data center. In some implementations, a group of network devices 230 may be a group of data center nodes that are used to route traffic flow through a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
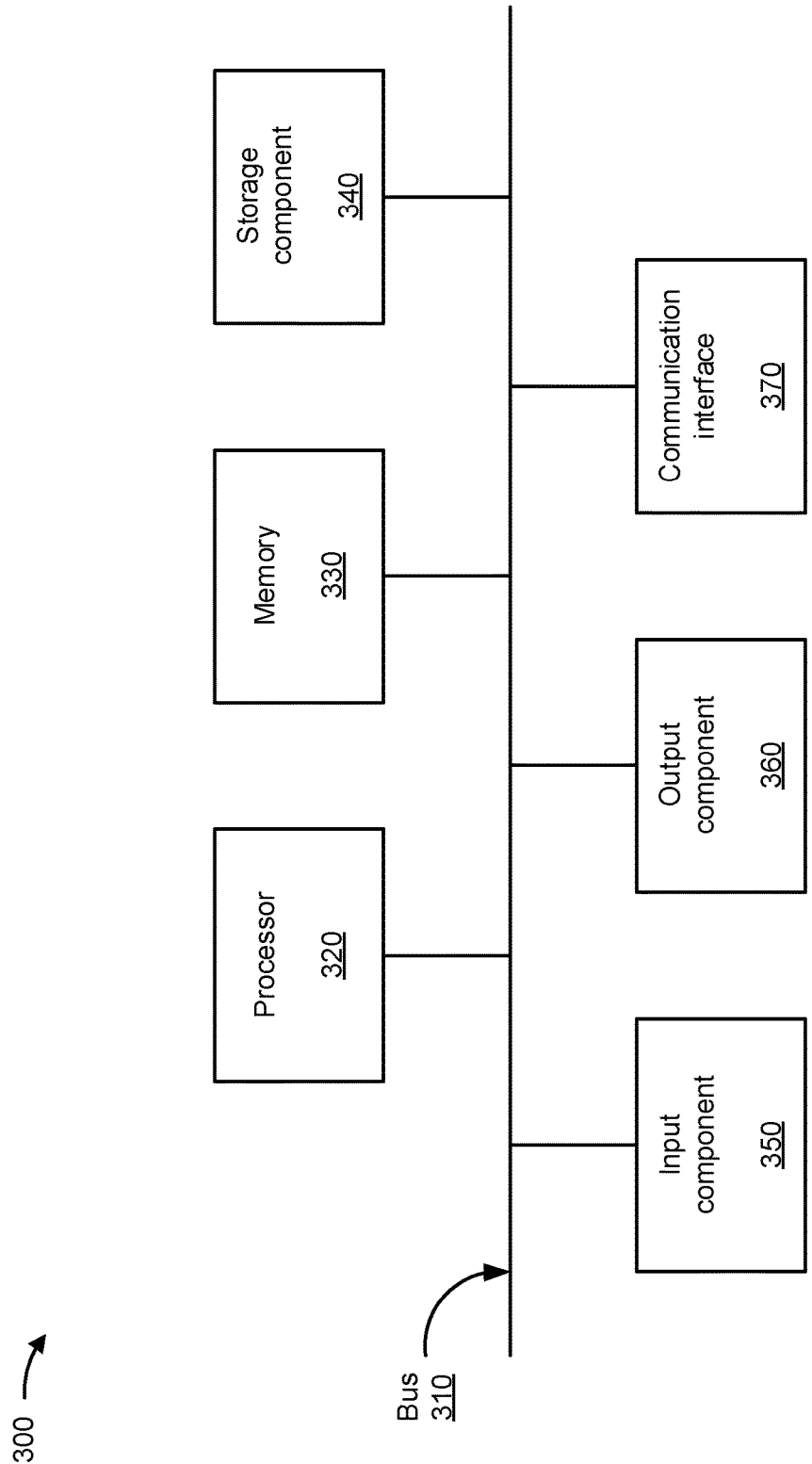
FIG. 3 is a diagram of example components of one or more devices of FIG. 2.

FIG. 3 is a diagram of example components of a device 300, which may correspond to analysis system 201 and/or network device 230. In some implementations, analysis system 201 and/or network device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for analyzing network data for debugging, performance, and identifying protocol violations using parallel multi-threaded processing. In some implementations, one or more process blocks of FIG. 4 may be performed by a device (e.g., analysis system 201). In some implementations, one or more process blocks of FIG. 4 may be performed by another device or a group of devices separate from or including the device, such as a network device (e.g., network device 230). Additionally, or alternatively, one or more process blocks of FIG. 4 may be performed by one or more components of device 300, such as processor 320, memory 330, storage component 340, input component 350, output component 360, communication component 370, and/or the like.

As shown in FIG. 4, process 400 may include receiving network protocol data identifying a network protocol trace associated with network devices of a network (block 410). For example, the device may receive network protocol data identifying a network protocol trace associated with network devices of a network, as described above.

As further shown in FIG. 4, process 400 may include dividing the network protocol trace into multiple segments (block 420). For example, the device may divide the network protocol trace into multiple segments, as described above.

As further shown in FIG. 4, process 400 may include identifying a set of segments, in the multiple segments, that includes a first segment and one or more second segments related to the first segment (block 430). For example, the device may identify a set of segments, in the multiple segments, that includes a first segment and one or more second segments related to the first segment, as described above.

As further shown in FIG. 4, process 400 may include processing the multiple segments, in parallel, to determine first results data corresponding to the multiple segments (block 440). For example, the device may process the multiple segments, in parallel, to determine first results data corresponding to the multiple segments, as described above.

As further shown in FIG. 4, process 400 may include processing the one or more second segments, in parallel, to determine second results data corresponding to the one or more second segments (block 450). For example, the device may process the one or more second segments, in parallel, to determine second results data corresponding to the one or more second segments, as described above.

As further shown in FIG. 4, process 400 may include combining the first results data and the second results data to generate final results data for the network protocol trace, wherein the final results data indicate utilization by the network devices of a network protocol associated with the network (block 460). For example, the device may combine the first results data and the second results data to generate final results data for the network protocol trace, wherein the final results data indicate utilization by the network devices of a network protocol associated with the network, as described above. In some implementations, the final results data indicate utilization by the network devices of a network protocol associated with the network.

As further shown in FIG. 4, process 400 may include performing one or more actions based on the final results data (block 470). For example, the device may perform one or more actions based on the final results data, as described above.

Process 400 may include additional implementations, such as any single implementation or any combination of implementations described below and/or in connection with one or more other processes described elsewhere herein.

In a first implementation, dividing the network protocol trace into the multiple segments includes dividing the network protocol trace into the multiple segments based on a quantity of data in the network protocol trace.

In a second implementation, alone or in combination with the first implementation, performing the one or more actions includes identifying a particular network device, of the network devices, that is improperly utilizing the network protocol, debugging the particular network device, or monitoring a performance of the particular network device.

In a third implementation, alone or in combination with one or more of the first and second implementations, performing the one or more actions includes determining that a particular network device, of the network devices, is improperly utilizing the network protocol and correcting the particular network device, ordering a replacement network device for the particular network device, or reprogramming the particular network device.

In a fourth implementation, alone or in combination with one or more of the first through third implementations, the first segment includes a command associated with the network protocol, and the one or more second segments include data associated with the command.

In a fifth implementation, alone or in combination with one or more of the first through fourth implementations, process 400 includes determining a quantity of pending exchanges for the one or more second segments based on the second results data, updating the first results data based on the quantity of pending exchanges and to generate updated first results data, and updating the final results data based on the updated first results data.

In a sixth implementation, alone or in combination with one or more of the first through fifth implementations, updating the first results data to generate the updated first results data includes generating an offset table that includes offset counts based on the quantity of pending exchanges for the one or more second segments, and utilizing the offset table to update the first results data and generate the updated first results data.

In a seventh implementation, alone or in combination with one or more of the first through sixth implementations, processing the one or more second segments, in parallel, to determine the second results data includes determining state data associated with processing the first segment, and processing the one or more second segments, in parallel and based on the state data, to determine the second results data.

In an eighth implementation, alone or in combination with one or more of the first through seventh implementations, process 400 includes determining that the network protocol trace includes a reset event; processing, in parallel, a first group of segments, of the multiple segments, occurring before the reset event, to determine third results data corresponding to the first group of segments; processing, in parallel, a second group of segments, of the multiple segments, occurring after the reset event, to determine fourth results data corresponding to the second group of segments; combining the third results data and the fourth results data to generate fifth results data for the network protocol trace, wherein the fifth results data indicate utilization by the network devices of the network protocol; and performing the one or more actions based on the fifth results data.

In a ninth implementation, alone or in combination with one or more of the first through eighth implementations, the reset event causes state information of the network devices to be reset to an initialized state.

In a tenth implementation, alone or in combination with one or more of the first through ninth implementations, process 400 includes determining that the network protocol trace includes a reset event; processing, in parallel, a first group of segments, of the multiple segments, occurring before the reset event, to determine third results data corresponding to the first group of segments; identifying a second group of segments, of the multiple segments, occurring after the reset event; dividing the second group of segments into new segments based on a quantity of data in the second group of segments; processing, in parallel, the new segments to determine fourth results data corresponding to the new segments; combining the third results data and the fourth results data to generate fifth results data for the network protocol trace, wherein the fifth results data indicate utilization by the network devices of the network protocol; and performing the one or more actions based on the fifth results data.

In an eleventh implementation, alone or in combination with one or more of the first through tenth implementations, the network protocol trace includes one or more packets, one or more frames, or one or more commands.

In a twelfth implementation, alone or in combination with one or more of the first through eleventh implementations, the final results data include data identifying performance characteristics of the network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
    dividing, by a system, a network protocol trace into multiple segments based on a quantity of data in the network protocol trace,
        wherein the network protocol trace includes an exchange, and
        wherein portions of the exchange are split across the multiple segments and include multiple types of events;
    processing, by the system, two or more segments, of the multiple segments, in parallel to determine final results data for the network protocol trace,
        wherein the final results data includes first result data and second result data;
    determining a quantity of pending exchanges based on the second result data; and
    updating, by the system, the final results data based on an offset table for the quantity of pending exchanges,
        wherein a first type of event, of the multiple types of events, is in a first segment of the two or more segments, and a second type of event, of the multiple types of events, is in a second segment of the two or more segments, and
        wherein the pending exchanges include the second type of event.

2. The method of claim 1, wherein each of the multiple segments requires approximately a same amount of time for processing.

3. The method of claim 1, wherein dividing the network protocol trace into the multiple segments comprises:
    grouping a first quantity of time periods of the network protocol trace into the first segment, and
    grouping a second quantity of time periods of the network protocol trace into the second segment.

4. The method of claim 3, wherein a first quantity of the first quantity of time periods is different from a second quantity of the first quantity of time periods.

5. The method of claim 3, wherein each time period of the first quantity of time periods is associated with a first quantity of data units, and
    wherein each time period of the second quantity of time periods is associated with a second quantity of data units that is different from the first quantity of data units.

6. The method of claim 1, wherein dividing the network protocol trace into the multiple segments comprises:
    grouping a quantity of time periods of the network protocol trace into the first segment, and
    designating a time period of the network protocol trace as the second segment.

7. The method of claim 1, wherein processing the two or more segments comprises:
    processing, by a first processor, the first segment, and
    processing, by a second processor, the second segment in parallel with the first processor processing the first segment.

8. The method of claim 1, further comprising:
    creating the offset table for the quantity of the pending exchanges.

9. A system, comprising:
    one or more memories; and
    one or more processors, coupled to the one or more memories, configured to:
        divide a network protocol trace into multiple segments based on a quantity of data in the network protocol trace
            wherein the network protocol trace includes an exchange, and
            wherein portions of the exchange are split across the multiple segments and include multiple types of events;
        process two or more segments, of the multiple segments, in parallel to determine final results data for the network protocol trace,
            wherein the final results data includes first result data and second result data;
        determine a quantity of pending exchanges based on the second result data; and
        update the final results data based on an offset table for the quantity of pending exchanges, wherein a first type of event, of the multiple types of events, is in a first segment of the two or more segments, and a second type of event, of the multiple types of events, is in a second segment of the two or more segments, and wherein the pending exchanges include the second type of event.

10. The system of claim 9, wherein each of the multiple segments requires approximately a same amount of time for processing.

11. The system of claim 9, wherein the one or more processors, to divide the network protocol trace into the multiple segments, are configured to:
group a first quantity of time periods of the network protocol trace into the first segment, and
group a second quantity of time periods of the network protocol trace into the second segment.

12. The system of claim 11, wherein a first quantity of the first quantity of time periods is different from a second quantity of the first quantity of time periods.

13. The system of claim 11, wherein each time period of the first quantity of time periods is associated with a first quantity of data units, and
wherein each time period of the second quantity of time periods is associated with a second quantity of data units that is different from the first quantity of data units.

14. The system of claim 9, wherein the one or more processors, to divide the network protocol trace into the multiple segments, are configured to:
group a quantity of time periods of the network protocol trace into the first segment, and
designate a time period of the network protocol trace as the second segment.

15. The system of claim 9,
wherein, to process the two or more segments, a first processor of the one or more processors is configured to:
process the first segment, and
wherein, to process the two or more segments, a second processor of the one or more processors is configured to:
process the second segment of the two or more segments in parallel with the first processor processing the first segment.

16. The system of claim 9, wherein the one or more processors are further configured to:
create the offset table for the quantity of the pending exchanges.

17. The system of claim 9, wherein the first type of event includes a command.

18. The system of claim 9, wherein the second type of event includes a sequence of data frames that identifies one or more completed exchanges.

19. The system of claim 9, wherein a third type of event, of the multiple types of events, is in a third segment of the two or more segments.

20. A non-transitory computer-readable medium storing a set of instructions, the set of instructions comprising:
one or more instructions that, when executed by one or more processors of a system, cause the system to:
divide a network protocol trace into multiple segments based on a quantity of data in the network protocol trace,
wherein the network protocol trace includes an exchange, and
wherein portions of the exchange are split across the multiple segments and include multiple types of events;
process two or more segments, of the multiple segments, in parallel to determine final results data for the network protocol trace,
wherein the final results data includes first result data and second result data;
determine a quantity of pending exchanges based on the second result data; and
update the final results data based on an offset table for the quantity of pending exchanges,
wherein a first type of event, of the multiple types of events, is in a first segment of the two or more segments, and a second type of event, of the multiple types of events, is in a second segment of the two or more segments, and
wherein the pending exchanges include the second type of event.

* * * * *